June 7, 1938. J. ELLIS 2,119,908
WAX MODELING SPATULA FOR DENTAL WORK
Filed Nov. 17, 1936
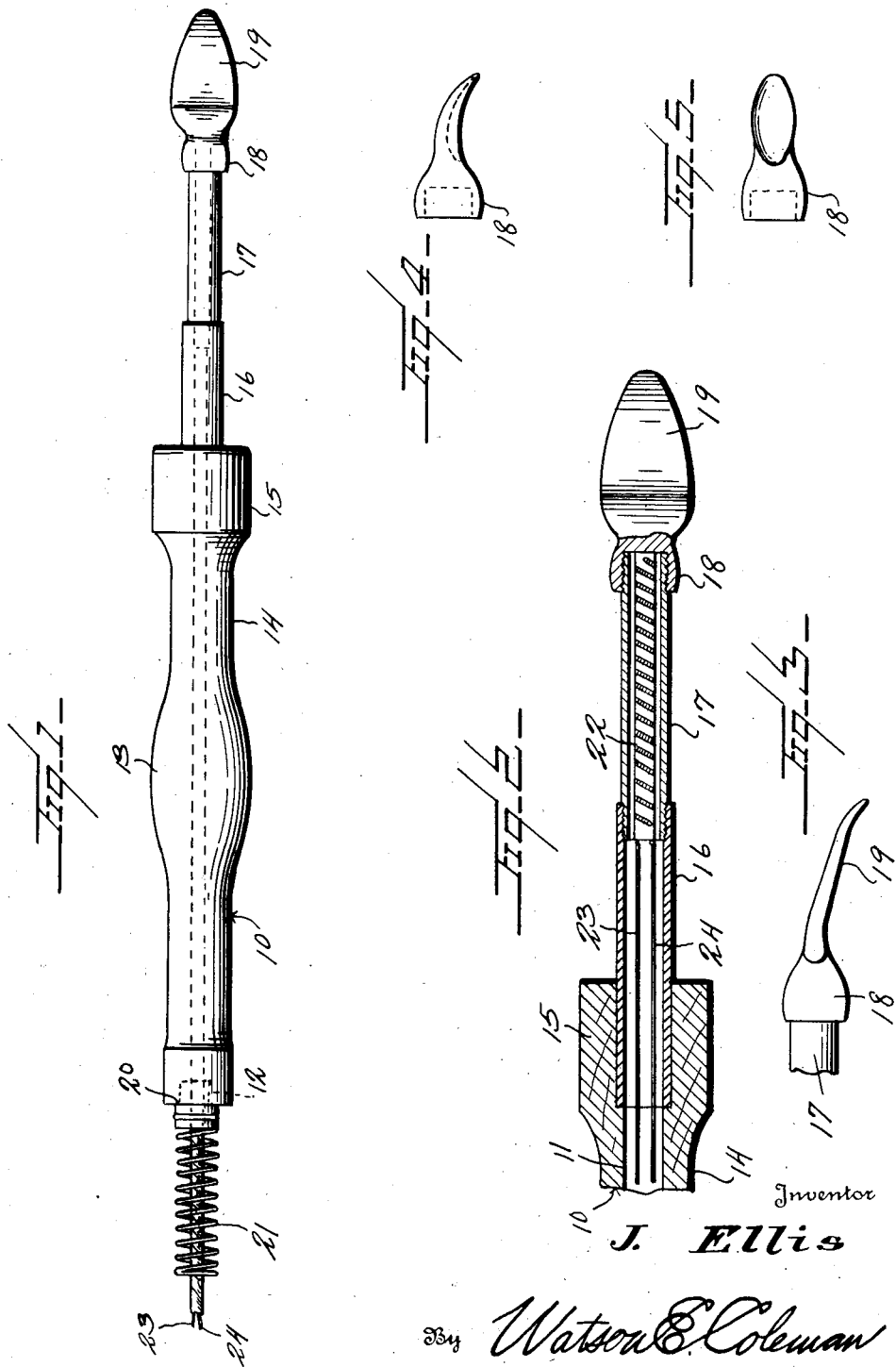
Inventor
J. Ellis
By Watson E. Coleman
Attorney Patented June 7, 1938

2,119,908

UNITED STATES PATENT OFFICE 2,119,908

WAX MODELING SPATULA FOR DENTAL WORK

Joseph Ellis, Columbus, Ohio

Application November 17, 1936, Serial No. 111,299

2 Claims. (Cl. 219—21)

This invention relates to spatulas such as are used by dentists or others for modeling wax, particularly for use in dental laboratories for "waxing up" partial or full dentures, for "trying in" or finshing dentures, for "waxing up" bridges, inlays, dummies, clasps and three-quarter crowns, and for many other uses where "waxing up" is necessary.

The spatulas at present used in all dental laboratories, to my knowledge, are of steel, and in use are intermittently heated over a gas flame. The "spoons" forming the terminal ends of the spatulas are so thin that the heat is rapidly dissipated and this requires that the spatula be constantly re-heated in the gas flame. Furthermore, there is no certainty of securing just the proper amount of heat.

Electrically heated spatulas have been devised, but all of them of which I have knowledge are open to one or more objections, and none of them are in use in dental laboratories, or as far as I know, by dentists.

The object of my invention, therefore, is not only to provide an electrically heated spatula but to so construct the spatula that it has the following advantages, namely, a certain but relatively low degree of heat; in which the electric heating element is disposed very close to the "spoon" so that the heat is communicated directly to the spoon; in which the heating element is separated from the handle portion of the spatula by a stainless steel tube, the stainless steel of this tube having only very slight heat conductivity; in which the handle is so constructed that it is heavy or thicker at the portion immediately adjacent the steel tube so as to withstand the very little heat that might be conducted to it by said tube; and in which the heating element can be very easily removed in case it is burned out and a new heating element put in place.

My invention is illustrated in the accompanying drawing wherein:

Figure 1 is an elevation of a waxing or modeling tool of the character described.

Figure 2 is an enlarged longitudinal sectional view of the forward portion of the tool.

Figures 3 and 4 are elevations of different forms of spoons adapted for engagement with the handle.

Figure 5 is a face view of the spoon shown in Figure 4.

Referring to the drawing, 10 designates a wooden or composition handle. The handle is tubular so as to provide a longitudinally extending bore 11. This bore is interiorly enlarged at its rear end, as at 12. The rear end of the handle is in the form of a relatively small cylinder which extends approximately one-third of the length of the handle and then the handle is enlarged, as at 13, and then reduced in diameter, at 14, and immediately forward of this reduced portion, the exterior diameter of the handle is increased, as at 15. These details as to the formation of the handle are important from a practical point of view in order to properly balance the instrument and permit it to be readily manipulated for all the purposes for which it is designed.

Forced into the thickened portion 15 of the handle is a tube 16 of relatively thin stainless steel. Stainless steel is used because of its low heat conductivity. Screw threaded into the forward extremity of this tube 16 is a tube 17 of light brass, though I do not wish to be limited to this metal. This tube 17 at its forward end is exteriorly screw threaded for engagement with a socket 18 formed on the rear end of the spoon 19. Engaged in the socket end 12 of the handle is a ferrule or plug 20 and engaged with this plug is a coiled spring 21.

Disposed within the tubular section 17 is an electric heating element 22 of any suitable character. Inasmuch as electric heating elements are common and well known, I see no necessity of illustrating in particular detail the electric heating element which I use. Extending from the heating element 22 are the two conductor cords 23 and 24 which extend through the hollow handle and through the ferrule 20 and through the center of the coil spring 21. The whole purpose of the spring 21 is to prevent the conductor from being bent at right angles to the instrument or becoming "kinked" and broken.

The "spoons" used may be of any desired shape or form such as are commonly used in dental laboratories. They may be so designed as to be capable of being dipped into wax and holding a certain amount of melted wax in the spoon, or they may be used purely as melting and smoothing implements. Figures 3 and 4 show a number of these spoons of different shapes designated 19ᵃ, 19ᵇ, and 19ᶜ and each of these spoons is formed with the socket 18 interiorly screw threaded to engage with the forward extremity of the tubular housing 17 for the heating element.

It will be seen that with my device, the spoon is screwed over the tube 17 containing the heating element and that if this socket 18 be screwed on tight, it will not move during the use of the instrument. Inasmuch as the heating element is in close proximity to the highly conductive tube 17 and in close proximity to the spoon itself, the spoon will take its heat from the heating element almost directly. In other electrically heated spatulas known to me, a long tapered element of metal extends from the spoon which must become heated before the tip end of the spoon gets any heat at all. The handle of my device is particularly designed to conform to the hand and is easy and convenient to hold and manipulate during use. In my structure there is no metallic element in the body of the handle which would tend to conduct heat to that portion of the handle held in the hand and fingers but instead, a tube 16 is used which has relatively slight heat conductivity and this is only inserted partly into the forward end of the handle, and this end of the handle is so thick, as at 15, that only a slight warmth is transmitted even if the fingers are accidently placed upon this portion 15. In other structures known to me and devised for this purpose, there is a metallic sleeve or metallic members extending all the way through the handle and tend to conduct heat thereto. In my structure, the source of heat is not in the same part of the device as the handle is. The heat required to heat the spoon is too great for comfortable handling if the heating element be placed within the handle itself.

In my construction, there is a distance of 1 inch between the tube 17 and the thickened portion 15 of the handle, and not only is the tube 16 of stainless steel which, as before remarked, is only slightly conductive of heat, but the tube is so thin that it will dissipate the heat very quickly rather than conduct it to the handle.

It will be noted that the sockets of the spoons extend over or around the end of the heating element, therefore, the heat has very little distance to travel in order to heat the spoon. Should the heating element burn out, the instrument may be readily taken apart so as to permit a new heating element to be put in place.

It will be noticed that there are very few metal parts in my spatula and that these parts are only of thin metal so that the tool is light. If the tool is too heavy (as when there are too many metal parts) anybody using it eight hours a day would become very weary with handling it. Furthermore, if there is any amount of heat close to the hand or where there are metal parts close to the hand tending to throw off or radiate heat, although this heat may not burn the hand, yet it will irritate the operator after several hours of use.

The spoons may, of course, be made of any suitable material and of many different forms, as stated. Usually the small spoons are made of brass and the large spoons of copper. Preferably the spoons and the tube 17 containing the heating element are chromium-plated to reduce the radiation of heat on the surface and to check oxidation.

While I have illustrated certain details of construction and certain particular arrangement of parts, and while I have found that these are particularly effective in actual use, I do not wish to be limited thereto, as obviously minor changes might be made without departing from the spirit of the invention as defined in the appended claims.

What is claimed is:—

1. A dental spatula, including a thick-walled non-metallic handle having a longitudinally extending bore therethrough, the handle at its forward end being increased in diameter to form a finger guard, a thin metallic tube inserted into the thickened extremity of the handle, forming a permanent part thereof and having a close fit therein, a second thin metallic tube having screw threaded engagement with the forward end of the first named tube, a spatula spoon having a socket screw threaded for engagement with the forward end of the second named tube, an electric heating element disposed entirely within the last named tube and extending to the extreme forward end thereof, conductors extending through the tube handle, a ferrule having tight-fitting but removable engagement with the rear end of the handle and through which the conductors pass, and a coiled conductor protective spring engageable with the ferrule and through which the conductors pass.

2. A dental spatula, including a thick-walled tubular handle of non-heat-conductive material, the rear portion of the handle being reduced in diameter to constitute a cylindrical portion, the forward end of the handle having an enlarged portion to constitute a finger guard, the handle just rearward of this enlarged portion being gradually reduced in diameter and then enlarged to form a bulbous portion, a thin metallic tube forced into the thickened end of the handle, forming a permanent portion thereof and having a close fit therein, a second thin metallic tube having screw threaded engagement at the forward end of the first named tube and screw threaded at its forward end, a spatula spoon having a screw threaded socket in which the forward end of the second named metallic tube is engageable, an electric heating element disposed entirely within the second named tube and extending to the extreme forward end thereof, and conductors extending out through the rear end of the tubular handle.

JOSEPH ELLIS.